Patented Mar. 7, 1939

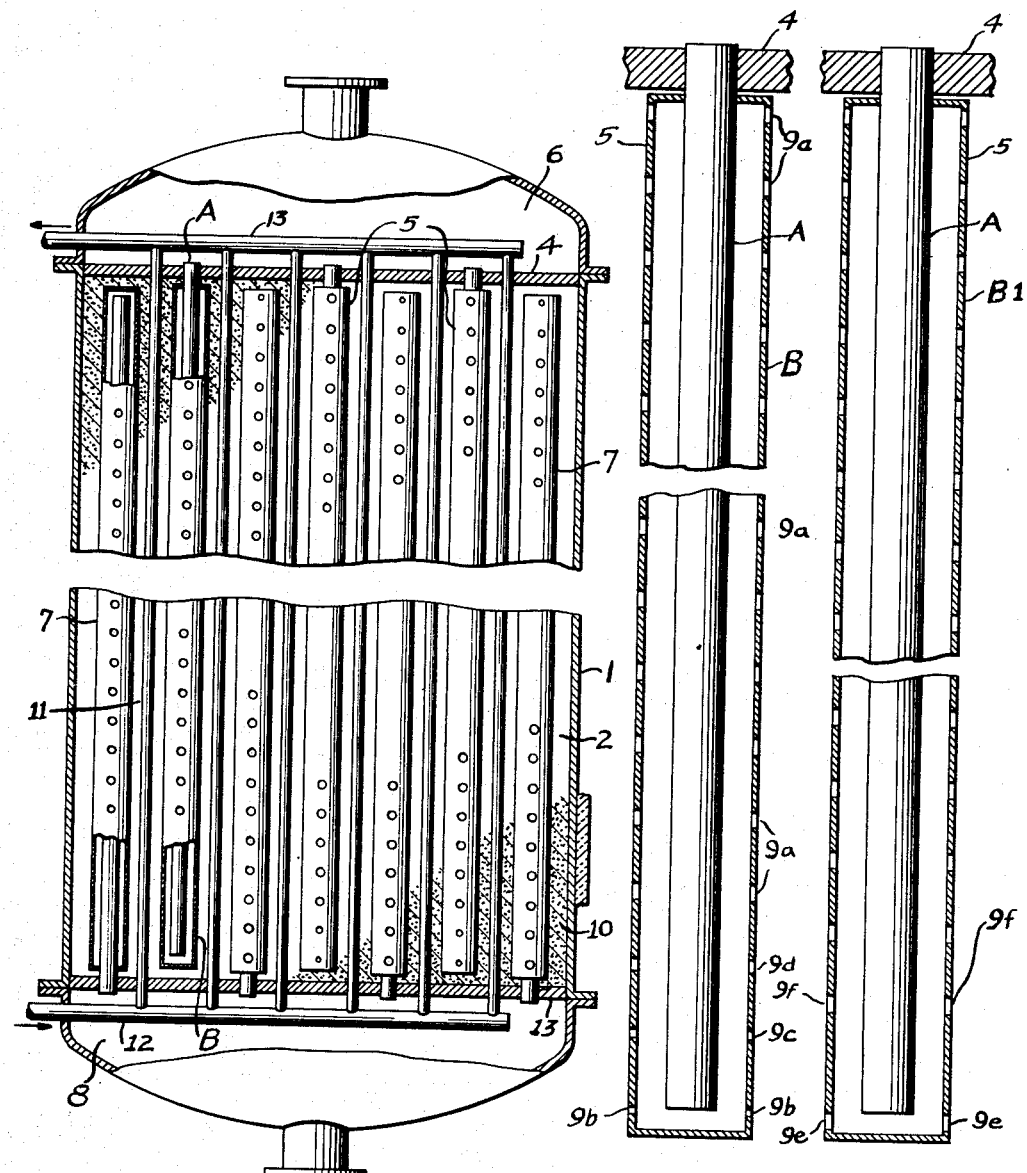

2,149,300

UNITED STATES PATENT OFFICE 2,149,300

DISTRIBUTION AND TEMPERATURE CONTROL IN CHEMICAL REACTIONS

Raymond C. Lassiat, Swarthmore, Pa., assignor to Houdry Process Corporation, Wilmington, Del., a corporation of Delaware Application February 12, 1938, Serial No. 190,231

6 Claims. (Cl. 23—288)

This application is a continuation in part of my copending application Serial No. 44,516, filed October 11, 1935, and entitled "Fluid distribution".

The present invention relates to the treatment or conversion of fluids and to the control of such operations. It particularly concerns an operation whereby uniform or desired distribution of fluids within and throughout a contact material or catalyst can be realized while at the same time the temperature of the contact material may be controlled as desired or maintained uniform, particularly according to the manner hereinafter more fully described.

Illustrative of the operations to which the present invention applies are, for example, those in which hydrocarbons or other fluids are subjected to treatment or transformation in the presence of a catalytic or contact material, which latter may be disposed in the form of a mass or deep bed. Certain methods of carrying out such operations, i. e. where a bed or body of catalytic material is employed, have previously been described; see for example U. S. Patent No. 1,992,946, issued to J. W. Harrison on March 5, 1935. This patent illustrates apparatus wherein reactant fluid and/or regenerating medium are passed in reverse flow or return flow passage through confined double streams which are spaced from each other within the reaction zone of a converter containing catalyst or contact material. Usually these double streams are disposed in approximate parallelism with each other. Double conduits and reverse flow passage of reactant fluids, as generally illustrated in the aforementioned patent to Harrison, are useful in smoothing out differences in temperature which may exist between reactants or regenerating medium, as the case may be, which are being charged to the reaction zone of a converter and the temperature which it is desired to maintain within the reaction zone itself, regardless of the magnitude of those differences and even though they are relatively small and insufficient to provide any substantial control of the temperature of the reaction zone or of contact material located therein.

Heretofore it has been customary to employ double or nested conduits to effect the reverse flow passage of fluids before the latter were allowed to come into contact with the bed of catalyst and, in such use, it had been customary, prior to this invention, to have ports or openings in the walls of the outer conduit of each nested assembly of uniform size and spaced uniformly along and around the same. It also was customary to have the open end of the inner conduit of each nested conduit assembly spaced somewhat from the end of the outer conduit, allowing the stream of fluid passing from the inner conduit to be directed against the adjacent closed end of the outer conduit, thereby to cause the direction of the fluid to be reversed and the stream to flow through the passage (usually annular) between the inner and outer conduits of each nested conduit assembly.

Where such a system of contacting a fluid was employed, for example where the fluid was a heavy hydrocarbon from which it was desired to produce gasoline, I found that under certain conditions of operation a reaction was occurring within the contact mass which was non-uniform in different sections of the contact material along the length of the conduits. Various things led me to this conclusion including evidence which I discovered of non-uniform deposits of carbonaceous and other materials and non-uniform temperatures in different depths of the mass along the length of the conduits. Many possible causes of these very undesirable conditions were investigated, and, finally, I discovered that these non-uniform conditions were apparently due to an undesired distribution of fluid or a non-uniform introduction thereof into the contact mass along the length of the perforated distributing conduits. This tendency away from uniformity of operation appeared more or less pronounced, dependent upon the structural design of the converter and particular operative conditions, particularly feed rate.

The above discussion is given only to help elucidate theories or features which may aid in the understanding of the invention as a whole. However, regardless of what theoretical analysis of the difficulties encountered in the use of prior apparatus is the correct one, I have found that non-uniformity and unbalanced conditions of reaction can be obviated, or at least substantially minimized by the use of modifications which are the subject matter of this invention.

In the use of double or nested distribution units or conduit assemblies as above described, although the ports or perforations in the outer conduit were of uniform size and uniformly arranged and although the pressure in the annular or like space between the inner and outer conduit and that within the inner conduit were, in the main, not greatly different, nevertheless I have discovered that desired uniformity of conditions of operation were not being attained due to the lack of sufficient uniformity of distribution of fluid reactants into the catalytic mass. Further, I have determined that the lack of uniform or desired distribution of fluids into and through the mass was, to an important extent, due to the fact that, during operation, a localized zone of high static pressure would occur within each double conduit assembly, adjacent the open end of the inner conduit, of such magnitude as to cause a substantially greater flow of fluid through apertures or ports in the outer conduits located adjacent thereto than was occurring through the rest of the ports, located at points remote from the open end of the inner conduit: that is, distant from the zone of reversal of fluid flow or high static pressure.

In accordance with these discoveries I have found that the operation of apparatus of the type heretofore discussed can be improved and difficulties heretofore encountered can be obviated by controlling the extent of the ports or apertures in the outer conduit of each double or nested assembly in a manner different from that in which other ports or openings in such outer conduit are controlled. In particular I have discovered that the extent of the openings (as determined by the size and/or spacing thereof) should be controlled so as to provide a greater throttling effect along the length of the outer conduit adjacent the open end of the inner conduit, i. e. adjacent or along the zone of reversal of flu'd flow. In other words, the openings or ports in the outer conduit of each nested assembly adjacent the zone of reversal of fluid flow may be made smaller than the openings or ports in other portions of each respective outer conduit and of the same spacing; or they may be made the same size as openings in other portions of each of the outer conduits but spaced further apart; or a combination of these two methods of control may be employed.

It is an object of my invention to provide a uniform and balanced contact or catalytic operation and means for attaining the same. It is a further object of my invention to provide apparatus and a method of operation wherein improved results will be obtained throughout a substantial range of operating conditions. It is also an object of my invention to provide for uniform or desired distribution of fluids or reactants throughout all portions of a bed or body of contact or catalytic material, and, in particular, to provide such distribution in all portions of a bed or body of catalyst throughout the length of perforated or apertured conduits, of the type hereinabove mentioned, which are surrounded by contact material. To accomplish these and other objects and advantages, while also controlling temperatures by advantageously effecting heat exchange, are among the further objects which will appear from the specification as a whole.

Suitable illustrative apparatus for carrying the invention into operation can be most quickly understood by reference to the accompanying drawing, in which:

Fig. 1 is an elevational view, partly in section, of a catalytic converter having double or nested conduits extending within the reaction zone thereof;

Fig. 2 is an enlarged view of one of the double conduit assemblies of Fig. 1 showing apertures or ports in the outer conduit, adjacent the open end of the inner conduit, of smaller size than the ports located along the remainder of the outer conduit; and Fig. 3 is quite similar to Fig. 2 except that, in place of having the openings adjacent the open end of the inner conduit of smaller size, substantially uniformly sized ports or apertures are maintained throughout, but a greater spacing of ports is provided adjacent the open end of the inner conduit.

Referring more in detail to the drawing, in the several figures of which like reference characters denote similar parts, 1 is a converter having reaction chamber 2 bounded by lower tube sheet 3 and upper tube sheet 4. A number of double or nested conduit assemblies 5, which by way of illustration may be used for the introduction and distribution of fluids, extend within the reaction chamber and communicate through tube sheet 4 with manifolding chamber 6. Conduit assemblies 7 extend within the reaction chamber 2 in interspersed and approximately symmetrical relation with conduits 5 and each communicates through tube sheet 3 with manifolding chamber 8. Conduit assemblies 5 may be considered as induction conduits and conduit assemblies 7 as eduction conduits. It is important that the induction conduits be of the double or nested construction illustrated. While the outlet conduits, if desired, may each consist of a single tube, conduits 7 have also been illustrated as of the double or nested variety. Accordingly the reactants may be introduced into the upper manifolding chamber and products of reaction withdrawn from the lower manifolding chamber, or, where desired, the flow may be reversed, reactants being introduced into the lower manifolding chamber and products of reaction being withdrawn from the upper manifolding chamber.

Separate specific forms of induction conduit assemblies 5 are illustrated in Figs. 2 and 3. In Fig. 2, the assembly comprises insert or inner conduit A and outer apertured conduit B, the majority of apertures or ports in the outer conduit being of uniform size and of uniform spacing and being indicated by 9a. However, at the end of the outer conduit adjacent the open end of the inner conduit, the openings or ports are sufficiently restricted in extent, specifically in size, so as to provide enough of throttling of the reactants distributed through such ports into the surrounding catalyst as to offset or compensate for the increased static pressure which, as above described, is, during operation, built up adjacent the open end of the inner conduit due to the reversal of flow of fluids in that zone. Accordingly, ports 9b, 9c and 9d are of somewhat smaller size than 9a, although the difference in sizes is somewhat exaggerated in the drawing for the sake of ready illustration. For example, openings 9c and 9d may be almost as large as 9a. In fact, construction where openings 9c and 9d are precisely the same size as 9a, the lowermost openings 9b being the only group which are of smaller size, is comprehended by the present invention. This latter type of construction will give satisfactory service in most instances, an exemplary exception being those instances where the ports in conduit B are so closely spaced that several rows occur within a short distance of the open end of conduit A.

In the specific embodiment illustrated in Fig. 3, all of the openings or ports in outer conduit B1 are substantially of uniform size and, throughout the major portion of the outer conduit, such ports are uniformly spaced. However, adjacent the open end of the insert or inner conduit A, the openings or ports in the outer conduit are spaced more widely apart. In accordance with the illustration provided by Fig. 3, the distance between ports 9e and ports 9f is greater than that between the remaining ports or groups of ports in conduit B1.

Without intending in any way to limit the present invention and solely for the purpose of further illustration, the use of my apparatus in conducting an operation for the conversion or transformation of hydrocarbons will be discussed. Specifically, an operation which is one primarily of cracking or transformation of higher to lower boiling hydrocarbons will be selected, by way of example. In such case the reaction chamber 2 (Fig. 1) may contain a bed of contact material or catalyst 10 composed of a blend of silica with another metalliferous material capable of rendering the whole mass active, e. g. a blend of silica and alumina in molded form or of such size and shape as to make the catalyst capable of readily being regenerated in situ. Let us also assume that it is desired to conduct the reaction or conversion of hydrocarbons within the temperature range of, say, 840 to 880° F. Hydrocarbons such as a gas oil fraction of petroleum may be heated and vaporized in suitable apparatus, not shown, so as to bring the same to a temperature within or approximating the aforementioned range, and then the heated hydrocarbon vapors may be introduced through the upper head of the converter into manifolding chamber 6. From manifolding chamber 6 these heated vaporous reactants will pass into and through inserts A of conduit assemblies 5. Vaporous reactants flow through the inserts A to the lower end of each and then the direction of flow of the reactants is reversed and they flow up through the annular passage provided between the insert A and the surrounding outer conduit or tubular member B. From the latter annular space of each of the conduit assemblies, vaporous hydrocarbon reactants are distributed substantially uniformly into contact material or catalyst 10 through the ports shown in the outer conduits B of each of the nested assemblies. In the normal use of such apparatus, the rates of feed of the reactants are sufficiently great that, in the event all of the perforations or ports in the distribution conduits were of uniform size and uniformly spaced, a non-uniform distribution of reactants through the catalyst would result. This is evidently because, as above described, when fluid leaves the inner conduit or insert of each of the nested assemblies to flow through the annular space between the insert and surrounding outer conduit, a reversal in the direction of the flow of the fluid is necessitated which appears to build up quite a substantial pressure in the immediate zone of reversal of flow. By limiting the extent of the openings or ports in the outer conduits adjacent each of these zones of reversal of direction of fluid flow (i. e. by making such ports smaller and/or by spacing them further from adjacent openings or groups of openings), a substantially uniform distribution of fluid through all parts of the bed of catalyst is made possible within the limits of variation of charging rate normally desired for any predetermined type of reactions. By building a treating or conversion apparatus in the manner herein illustrated and described, a substantially more uniform operation can be attained, even within wide ranges of feed rates, than in the case where the ports of distribution conduits are of uniform size and uniformly spaced throughout.

After a period of time on-stream in carrying out the above illustrated reaction, contaminants and combustible deposits accumulate on the contact material 10 which must be removed. This may be accomplished by interrupting the flow of hydrocarbon reactants and passing an oxygen-containing regenerating medium through the catalyst for a period of time sufficiently long to remove and burn away the contaminating deposits. Assuming that it is desired to conduct the regeneration at a temperature not in excess of 1050° F., air or other desired oxygen-containing regenerating medium may be introduced at any suitable temperature, e. g. lower than the aforesaid temperature, either by introducing the regenerating medium into manifolding chamber 6 and passing it through the converter in the same path as hydrocarbons were passed, or by introducing the regenerating medium into manifolding chamber 8 and thus passing it through the converter in the reverse direction.

After the passage of regenerating medium has continued until the catalyst is substantially restored to activity (which is readily determined by a drop in temperature of the mass or by the nature of the outgoing fumes of regeneration) the introduction of regenerating medium will be stopped and vaporous hydrocarbon reactants as above described again introduced and these steps of operation repeated over and over.

Such a reaction as described will be endothermic throughout transformation of the hydrocarbons and exothermic during each step of regeneration. Since an illustrative operation has been described in which both the reactants and regenerating medium may, if desired, be sent to the catalyst at temperatures near or approximating the respective temperatures desired therein, or above or below the same, it may be necessary or desirable to supply heat to the catalyst or reaction chamber during the on-stream step and/or to withdraw heat therefrom during each step of regeneration in order to maintain the reaction zone within the desired respective ranges and to effect temperature transitions between reactions. This may be accomplished by flowing a suitable heat exchange medium such as fused salt, water or steam, mercury, or the like, under suitable temperature conditions in heat exchange relation with the catalyst. For this purpose heat exchange tubes 11, with or without fins, extend through the reaction chamber, being fed by lower tubular manifold 12 and emptying into upper tubular manifold 13. Such a heat exchange system can, where desired, be utilized for rapidly effecting major additions of heat to the reaction chamber 2 or withdrawals of heat therefrom, while minor differences or fluctuations in the temperature of reactants or regenerating medium sent to the reaction chamber are adjusted in relation to desired temperatures of reaction or regeneration respectively by the double or nested distribution conduits shown, which effect heat exchange between incoming reactants or regenerating medium and the mass throughout the depth thereof before the respective reactants or regenerating medium actually come in contact with the mass.

The invention will be understood from the description as a whole and from the above illustrations, which latter are exemplary only and are not to be taken as limitations. All changes and modifications within the scope of the appended claims are comprehended.

What I claim is:

1. Apparatus for effecting chemical reactions comprising a casing providing a reaction chamber, the latter being adapted to contain contact material, a series of elongate apertured distributing units and a series of apertured outlet conduits extending within said reaction chamber in in interspersed relation with each other and in approximate parallelism, each of said distributing units comprising an inner conduit and an outer conduit in nested relation, said inner conduit being spaced from said outer conduit along the length thereof and having an opening in an end thereof terminating adjacent to but in spaced relation with the adjacent closed end of the outer conduit, said opening permitting reactant fluid to flow from said inner conduit into and in reverse direction through the passage between said inner conduit and said outer conduit, and said outer conduit having apertures spaced from each other around and throughout the length thereof, said apertures being of substantially uniform extent throughout the major portion of said outer conduit but being of less extent in that portion of the length of the outer conduit which is adjacent the aforesaid opening in said inner conduit, thereby to avoid introduction of excessive amounts of reactant fluids into the surrounding portions of the reaction zone as a result of the increased pressure which during use is built up in the zone of reversal of fluid flow, adjacent said opening in said inner conduit.

2. Converter apparatus for use in catalytic reactions or transformation of fluids comprising a casing providing a reaction chamber, the latter being adapted to contain contact or catalytic material, a plurality of elongate apertured distribution units and a plurality of apertured outlet conduits extending within said reaction chamber in interspersed relation with each other and in approximate parallelism, and a plurality of elongate tubes for the passage of heat exchange fluid extending into said reaction chamber in interspersed relation and approximate parallelism with the aforementioned conduits and in spaced relation therewith, each of said distribution units comprising an inner conduit and an outer conduit in nested relation with each other, said inner conduit being spaced from said outer conduit along the length thereof and having an opening in the end thereof terminating within said outer conduit and adjacent to but in spaced relation with the adjacent closed end of said outer conduit, said opening permitting reactant fluid to flow from said inner conduit into and in reverse direction through the passage between said inner conduit and said outer conduit, whereupon during use a zone of increased pressure will occur within each of said distribution units in the zone in which reversal of direction of flow of reactant fluid is effected, and the said outer conduit of each of said distribution units having distribution ports in the walls thereof and spaced from each other around and throughout the length of the same, the extent of said ports being substantially uniform throughout the major portion of the length of said outer conduit but, in the portion of said outer conduit which is located adjacent the said opening in said inner conduit, the extent of ports being sufficiently different from that of ports in the major portion of said outer conduit so as substantially to offset the effect of the aforesaid increased pressure which, during use, occurs in the zone of reversal of fluid flow within each of the said elongate distribution units.

3. Apparatus for the reverse flow passage of fluid which comprises a double or nested conduit assembly having an inner conduit and an outer conduit, said conduits being spaced from each other to provide an elongate passageway therebetween, said inner conduit having an opening in an end thereof terminating within said outer conduit and adjacent to but in spaced relation with the adjacent closed end of the outer conduit, said outer conduit having distribution ports in the walls thereof, spaced from each other around and throughout the length of the same, said ports being substantially uniform in extent throughout the major portion of the length of said outer conduit but, in the portion of said outer conduit which is located adjacent the said opening in said inner conduit, the ports being of diminished extent so as to offset the effect of the zone of increased pressure which, during use, occurs in the zone of reversal of direction of fluid flow within said conduit assembly and adjacent the said opening in the end of the inner conduit, thereby to maintain distribution of fluid from said outer conduit of desired uniformity throughout each unit length thereof.

4. Apparatus as described in claim 3 adapted for use in contact or catalytic operations, in which the extent of the ports in the portion of the outer conduit located adjacent the specified opening in the end of the said inner conduit is maintained of diminished magnitude, in relation to the extent of the ports in the major portion of the length of said outer conduit, by spacing the first-mentioned ports farther apart than those last-mentioned, thereby to provide for substantially uniform venting of fluids from said outer conduit along the length thereof.

5. Apparatus as described in claim 3 adapted for use in contact or catalytic operations, in which the extent of the ports in the portion of the outer conduit located adjacent the specified opening in the end of the said inner conduit is maintained of diminished magnitude, in relation to the extent of the ports in the major portion of the length of said outer conduit, by making the first-mentioned ports of smaller size than those last-mentioned, thereby to provide for substantially uniform venting of fluids from all parts of said outer conduit along the length thereof.

6. Apparatus as described in claim 3 adapted for use in contact or catalytic operations, in which the extent of the ports in that portion of the outer conduit located adjacent the specified opening in the end of the said inner conduit is maintained of diminished magnitude, in relation to the extent of the ports in the major portion of the length of said outer conduit, both by spacing the first-mentioned ports somewhat farther apart and also by making them smaller in size than those last-mentioned, thereby to provide desired uniformity of fluid venting from said outer conduit along the length thereof.

RAYMOND C. LASSIAT.